United States Patent [19]

Steffen

[11] 4,087,783
[45] May 2, 1978

[54] WHEEL INTERFERENCE MONITOR
[75] Inventor: Ronald W. Steffen, Chatham, Ill.
[73] Assignee: Dickey-john Corporation, Auburn, Ill.
[21] Appl. No.: 733,431
[22] Filed: Oct. 18, 1976
[51] Int. Cl.² .......................................... G08B 21/00
[52] U.S. Cl. ............................. 340/52 R; 180/103 R; 280/432; 340/282
[58] Field of Search ................. 340/52 R, 282, 275; 180/103 R; 280/432, 477; 73/1 E

[56] References Cited
U.S. PATENT DOCUMENTS

| Re. 28,590 | 10/1975 | Salmi | 280/477 |
|---|---|---|---|
| 2,213,221 | 9/1940 | Johnson | 340/52 R |
| 3,046,549 | 7/1962 | Kalmus | 343/113 |
| 3,237,177 | 2/1966 | Sparks et al. | 340/181 |
| 3,795,285 | 3/1974 | Scholl et al. | 180/79.2 B |
| 3,825,921 | 7/1974 | Marus et al. | 340/282 |
| 3,924,257 | 12/1975 | Roberts | 340/282 |

Primary Examiner—John W. Caldwell, Sr.
Assistant Examiner—Joseph E. Nowicki
Attorney, Agent, or Firm—Olson, Trexler, Wolters, Bushnell & Fosse, Ltd.

[57] ABSTRACT

A wheel interference monitor used with articulated vehicles and vehicles pulling connected trailers or the like, such as a tractor pulling a connected farm implement. The apparatus includes a sensor for monitoring the clearance between the drive vehicle and the pulled trailer or implement, and a circuit for providing a warning alarm to the operator if the clearance reaches a point where the operator must exercise caution, and an additional alarm for warning the operator as the clearance becomes even more critical, approaching a danger area. Also included is a control for setting in the degree of clearance at which the warning and alarm circuit will begin to go into operation.

11 Claims, 5 Drawing Figures

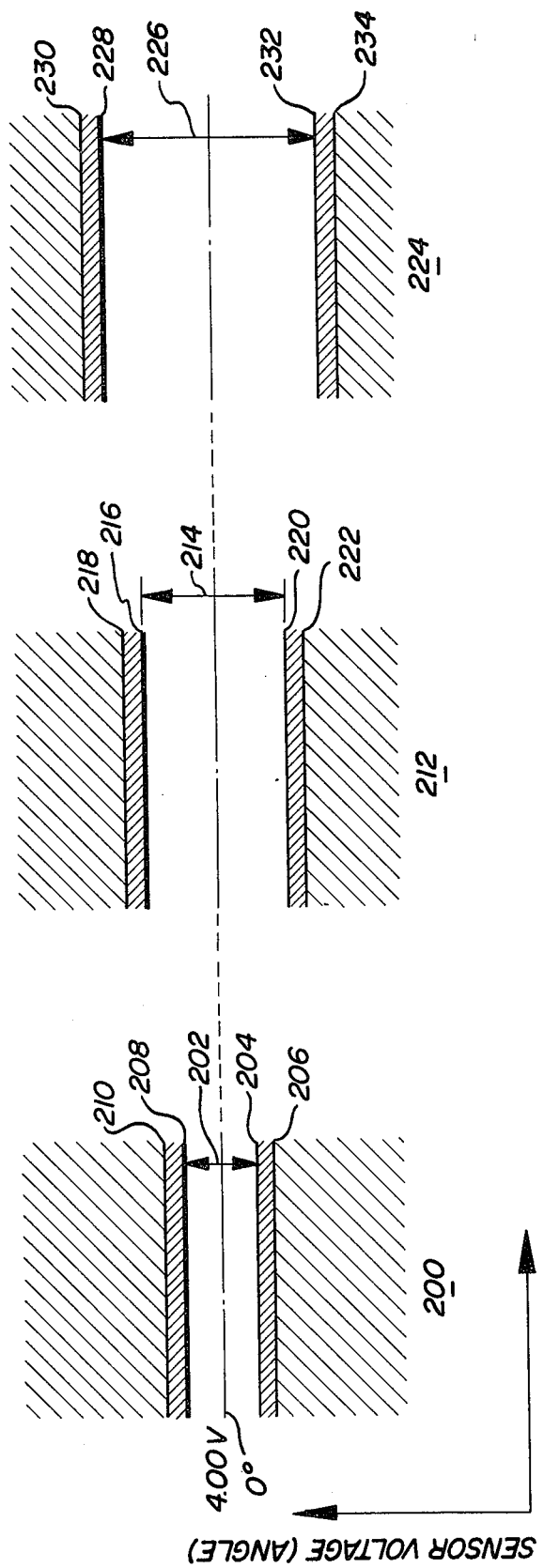
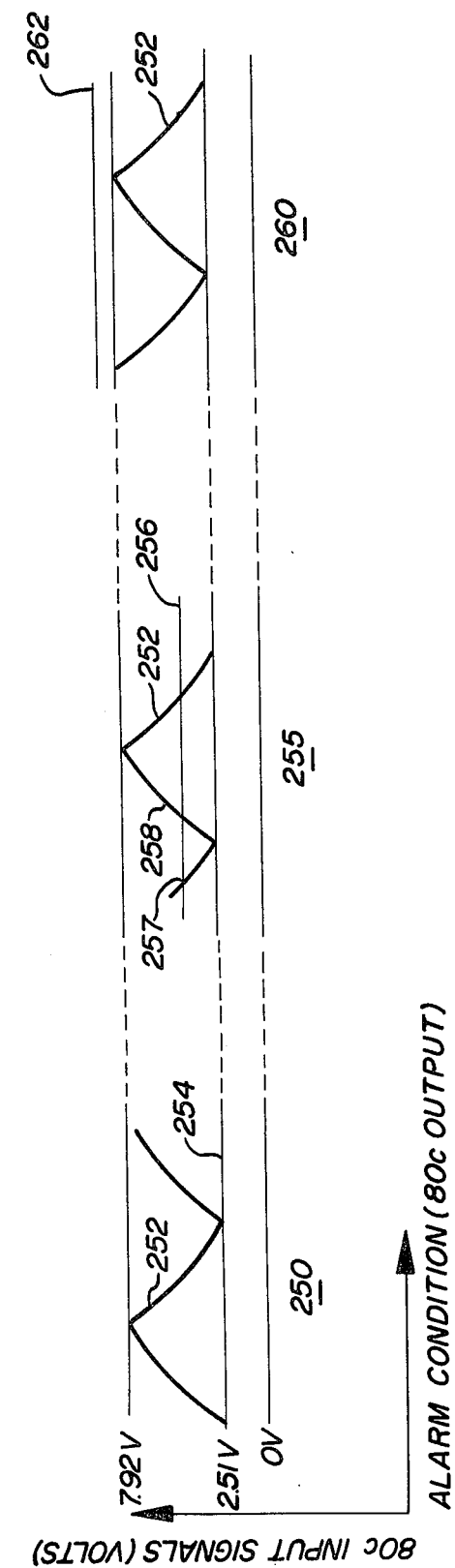
FIG. 4a
FIG. 4b

WHEEL INTERFERENCE MONITOR

BACKGROUND OF THE INVENTION

The present invention relates to a novel monitoring apparatus and more specifically to a novel monitoring apparatus for monitoring the clearance between a drive vehicle and a trailer or other vehicle connected to and pulled thereby, or between the portions of an articulated vehicle. While the main features of this invention may be adapted for use with a variety of vehicles, the disclosure will be facilitated by directing it particularly to the problem of monitoring the clearance between a tractor and a farm implement being pulled thereby.

With the increasing use of large tractors and implements in the agricultural field as well as articulated vehicles in the industrial field, a number of problems have arisen and persist relating to maintaining a safe clearance between the portions of the articulated vehicle or between the tractor and the implement, during turning. Using the tractor and implement combination as an example, if the tractor is turned too sharply, the rear tires of the tractor, or more specifically the inside rear tire or tires will interfere with the implement or with the hitch between the implement and tractor. In many cases where particularly large tractors and implements may be used, it can become very difficult or impossible for the operator to visually monitor the clearance between tractor and implement during turning. Therefore, operating vehicles of this size without some means of monitoring the clearance during turning can involve a certain degree of danger and risk.

OBJECTS AND SUMMARY OF THE INVENTION

It is an object of the present invention, therefore, to provide a novel monitoring apparatus for monitoring the clearance between a tractor and an implement during turning.

Another object of the present invention is to provide a novel monitoring apparatus which further includes alarm means for warning the operator when the clearance reaches a point where the operator must be cautious.

A further object of the present invention is to provide a novel monitoring apparatus which further includes alarm means for warning the operator when the clearance approaches a dangerous area of operation.

Another object of the present invention is to provide a monitoring apparatus further including means for setting a predetermined clearance at which the cautioning alarm will be activated.

A further object of the invention is to provide a novel monitoring system which monitors the angle of the implement with respect to the tractor thereby monitoring the clearance between tractor and implement during turning.

Yet another object of the present invention is to provide a monitoring apparatus in accordance with the foregoing objects wherein the means for adjusting the predetermined clearance at which the alarm will be activated, as well as the alarm means are located so as to be easily accessible to the operator of the vehicle.

Briefly, the monitor apparatus of the present invention comprises a control console and a sensor. The sensor includes a potentiometer mounted on the tractor hitch whose wiper is controlled by the implement hitch through a mechanical linkage. The potentiometer is of a suitable design to provide a resistance linearly proportional to the angle of the implement hitch with respect to the vehicle. This sensor is connected to the control console, which is located in the operator's cab of the vehicle, by suitable means for providing both a voltage source to the potentiometer and a voltage take-off point, so that the voltage signal received from the potentiometer will, like the potentiometer's resistance, be linearly proportional to the angle of the implement hitch with respect to the vehicle. The control console includes a suitable alarm means, circuit means including means for receiving the clearance signal from the sensor, means for adjusting a preset clearance at which the alarm is to be activated and providing a signal corresponding thereto, comparing means for comparing the sensor signal to the alarm preset signal, and providing an output signal in response thereto, and means connecting the output signal to the alarm means. The sensor, as well as the circuit means and preset means are of a symmetrical configuration so as to function identically for either left-hand or right-hand turning directions, and corresponding clearances. The circuit means also include means for causing the alarm signal to change from a caution alarm to a danger alarm when the angle of turn has exceeded the initial preset alarm clearance signal by a fixed amount.

The aforementioned as well as other objects and advantages of the present invention will become apparent from the following description of the accompanying drawings wherein:

FIGS. 4a and 4b are graphs illustrating the various modes of operation of the monitoring and alarm circuits according to the present invention.

DETAILED DESCRIPTION

Figure 1:
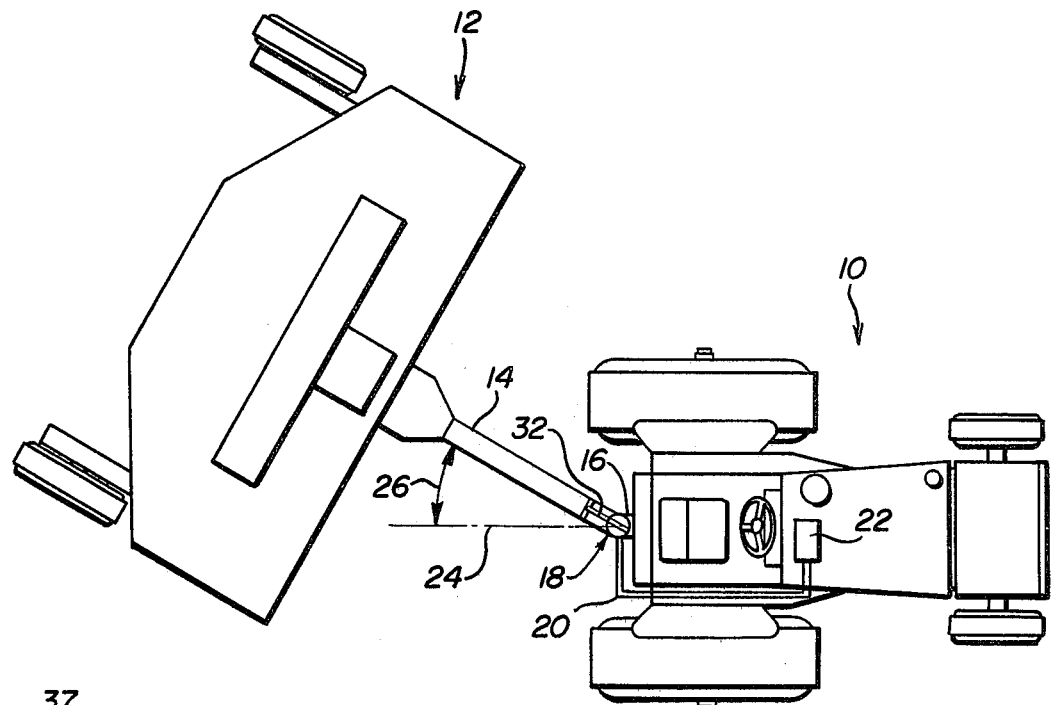
FIG. 1 is a plan view of a tractor pulling an implement and illustrates the various components necessary to operate the wheel interference monitor apparatus in accordance with the present invention.

Referring now to FIG. 1, a tractor 10 is shown pulling an implement 12, which is connected by implement hitch 14 to tractor hitch 16 using suitable connecting means. Sensor 18 is mounted upon the tractor hitch 16 by suitable means for sensing the angle 26 of the implement hitch 14 with respect to the line 24, an extension of the tractor hitch 16.

Figure 2:
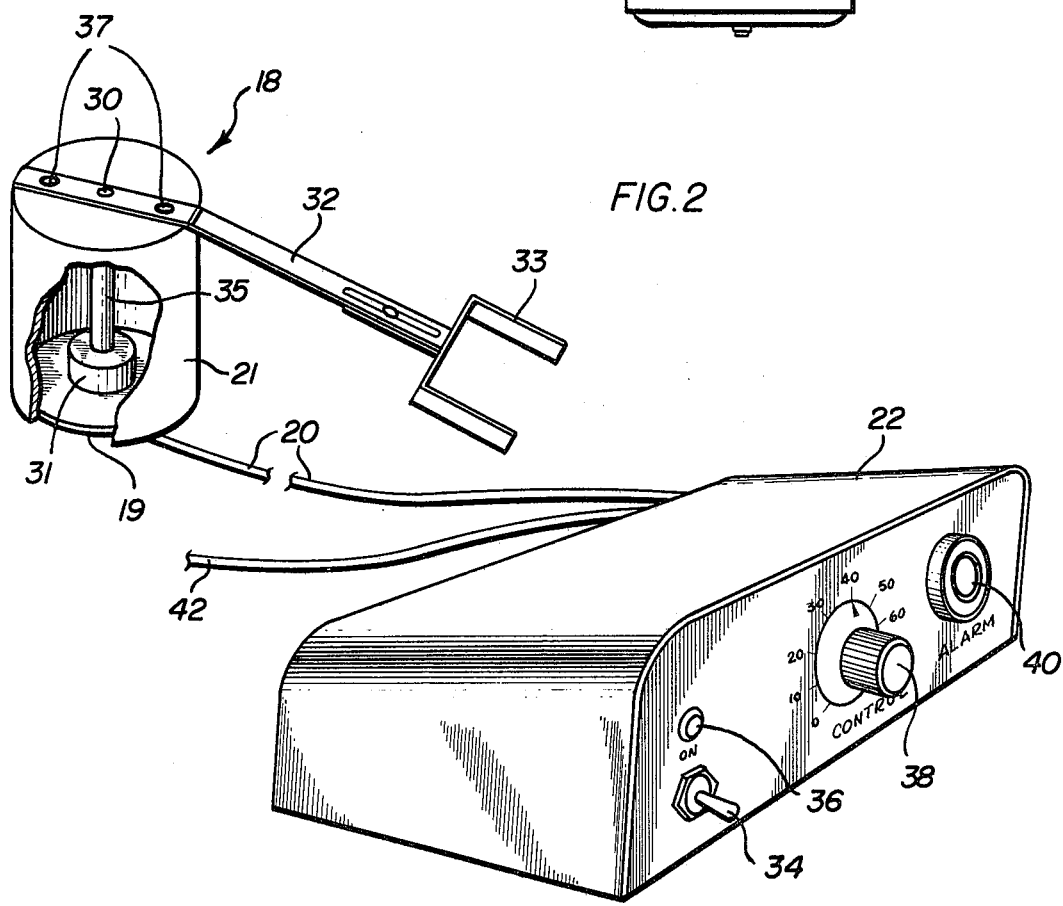
FIG. 2 illustrates a control console in conjunction with a sensor, according to the present invention.

As shown in FIG. 2, the sensor 18 comprises a base 19 adapted to be bolted or otherwise secured to the tractor hitch and a housing 21 rotatably mounted on the base 19. The housing contains a potentiometer 31 rigidly mounted on the base 19 provided with a rotatable shaft 35 attached by means 30 to the housing 21 for rotation in unison therewith. The housing 21 is mounted so that the vertical axis of rotation of the housing 21 and the shaft 35 coincides with the vertical axis of pivotal movement of the implement hitch 14 about the tractor hitch 16. An arm 32 is fixed to the housing 21 by suitable means 37 and is provided with a yoke 33 or other suitable means at its outer end for connection to the implement hitch 14. Thus the shaft 35 is effectively connected with and rotates in unison with the implement hitch 14. A suitable electrical cable is connected with the sensor 18 as described below and extends to console 22 which is mounted at a convenient location on the tractor 10 as shown in FIG. 1.

Referring further to FIG. 2, the control console 22 includes on-off switch 34 with suitable on-off indicator means 36, an alarm means 40, and means 38 for setting in the preset clearance at which the alarm is to be activated. Also included is suitable connecting means 42 to the power source for the control console, such as the tractor battery, not shown.

Figure 3:
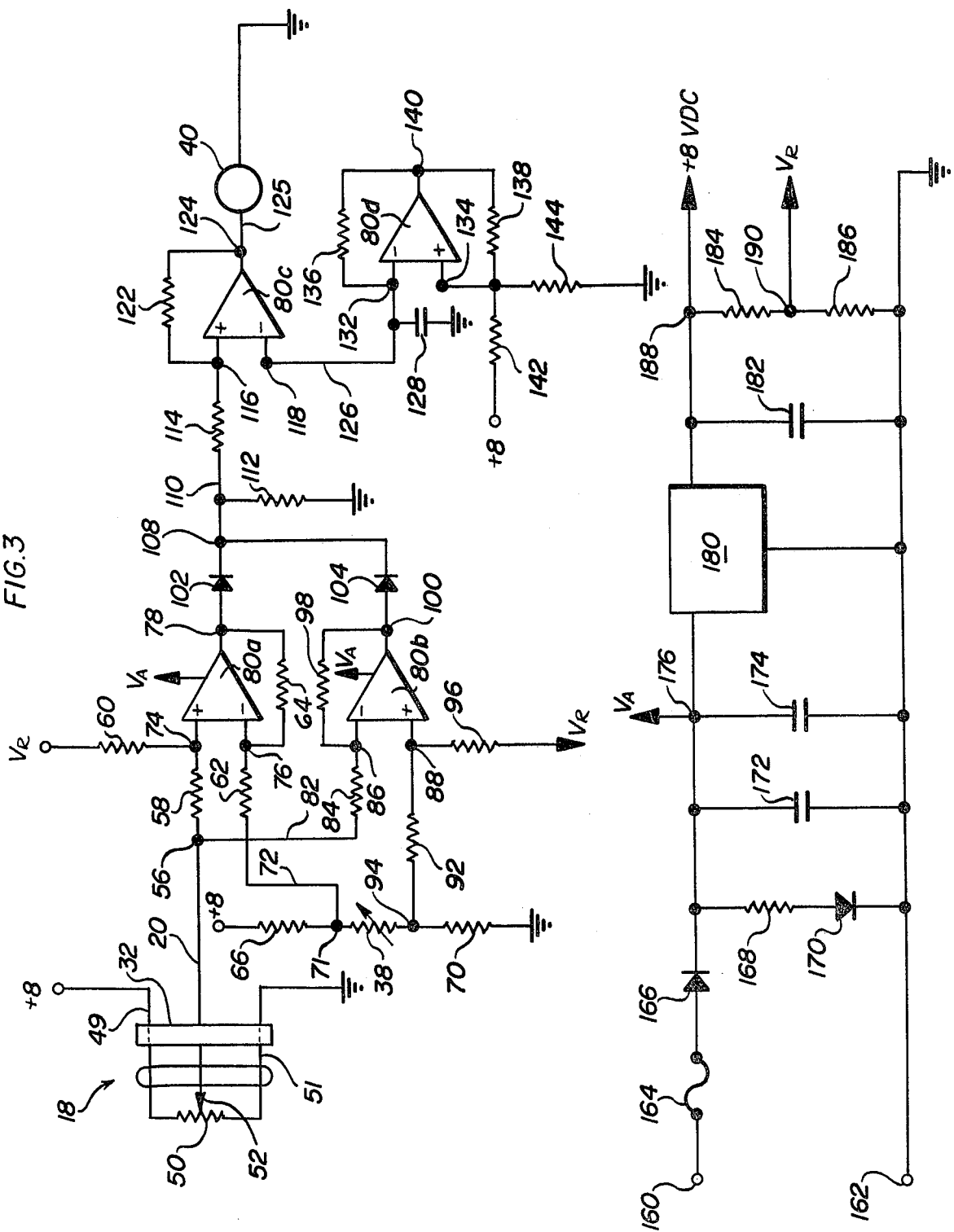
FIG. 3 is an electrical schematic diagram of an embodiment of a monitoring and alarm circuit in accordance with the present invention.

Referring now to FIG. 3, an electrical schematic diagram of a monitoring and alarm circuit according to the present invention is shown. Sensor 18 comprises potentiometer 31 including a resistance member 50 fixed on the base 19 with its opposite ends connected by connecting means 49 and 51 to the positive supply voltage and ground, respectively, and wiper arm 52 carried by shaft 35. Wiper arm 52 is thus mechanically activated by member 32 which, as previously indicated, is connected to the implement hitch of FIG. 1, so that the position of the wiper arm 52 on the resistance member 50 will be linearly proportional to the angle of the implement hitch. Wiper 52, then, provides a voltage signal from sensor 18 linearly porportional to the aforementioned angle, which signal is transmitted by electrical wire or cable 20 to input terminal 56 of the monitor and alarm circuitry. The resistance of resistance member 50 also varies linearly with its length and is constructed so that the voltage output at wiper arm 52, and therefore at input terminal 56 will be at a predetermined value representing a 0° angle, when the implement and tractor are aligned along a straight line causing wiper arm 52 to be at the center of resistance member 50. As the angle between the implement hitch and the tractor varies around the straight line or 0° condition, the voltage will correspondingly deviate by increasing or decreasing from the predetermined voltage which, may, by way of example only, be 4.00 volts.

It will be noted that the primary active component of the circuit is an integrated circuit package which comprises four operational amplifiers designated 80a, 80b, 80c, and 80d which are disposed at various locations within the circuit as will be described below. The first portion of the circuit comprises a difference amplifier including operational amplifiers 80a and 80b, resistors 58, 60, 62 and 64 associated with operational amplifier 80a, and resistors 84, 92, 96 and 98 associated with operational amplifier 80b, and a voltage divider network including resistors 66 and 70 and variable resistor 38. The angle or clearance signal at terminal 56 is connected to one end of resistor 58 whose other end is connected to input terminal 74 of operational amplifier 80a, and by connecting line 82 to one end of resistor 84 whose other end is connected to input terminal 86 of operational amplifier 80b.

The voltage divider network comprising resistor 66, variable resistor 38 and resistor 70 connected in series between the positive voltage supply and ground, is connected at terminal 71 by connecting line 72 to one end of resistor 62 whose other end is connected to input terminal 76 of the operational amplifier 80a. Terminal 94 of the voltage divider is connected to one end of resistor 92 which has its opposite end connected to input terminal 88 of operational amplifier 80b. Thus, variable resistor 38 provides an adjustable control on the console for adjusting the preset clearance at which the alarm is activated and, more specifically, provides an adjustable signal corresponding to the alarm activating clearance desired to the inputs 76 and 88 of operational amplifiers 80a and 80b, respectively, to be compared thereby with the actual clearance signal from the sensor 18 at the opposite input terminals 74 and 86 thereof, respectively.

Operational amplifier 80a is further provided with connecting means to a supply voltage $V_A$, feedback resistor 64 connected between output terminal 78 and input terminal 76, and a reference voltage $V_R$ connected to one end of resistor 60 whose other end is connected to input terminal 74. Similarly, operational amplifier 80b is provided with a connection to supply voltage $V_A$, feedback resistor 98 connected between output terminal 100 and input terminal 86, and reference voltage $V_R$ connected to one end of resistor 96 whose other end is connected to input terminal 88.

Therefore, the difference amplifier circuit functions as follows. The voltage at the high end of variable resistor 38 at terminal 71 is symmetrical about the center voltage with the voltage at the low end at terminal 94. These two end voltages form the reference levels for the operational amplifiers 80a and 80b at terminals 76 and 88 respectively. The adjustment of variable resistor 38, therefore, establishes an operating range within which there will be zero voltage output at the terminals 78 and 100 of the operational amplifiers 80a and 80b respectively. Operational amplifiers 80a and 80b then compare these two reference levels with the sensor voltage. If the sensor voltage is lower than the reference level at the operational amplifier 80a, or higher than the reference level at operational amplifier 80b, it is within the operating range established, indicating that the angle of the turn is less than the preset alarm clearance, and there will be not output signal at either terminal 78 or terminal 100. If the sensor voltage is equal to the reference level at either operational amplifier 80a or 80b, this indicates an angle of turn in the corresponding direction which is equal to the preset alarm clearance and therefore the output at either operational amplifier 80a or operational amplifier 80b, depending on the direction of the turn, left or right, will be equal to the reference voltage $V_R$. When the sensor voltage input either exceeds the reference level at operational amplifier 80a or is less than the reference level at operational amplifier 80b, it is an indication that the angle of turn is in excess of the preset alarm clearance, in either the left-hand or right-hand direction, and, therefore, the corresponding output at either terminal 78 or terminal 100 depending on the direction of turn, will exceed the reference voltage $V_R$ by an amount linearly corresponding to the excess.

Diodes 102 and 104 are connected to output terminal 78 of operational amplifier 80a and output terminal 100 of operational amplifier 80b, respectively, and have their opposite ends connected together at terminal 108, to form an OR circuit. Thus, the output at 108, if any, due to the symmetry of the circuitry as described above, will be the reference voltage $V_R$ plus a voltage corresponding linearly to the excess, if any, of the signal corresponding to the actual angle of the turn or clearance over the preset alarm clearance signal and will be the same voltage for such excess in either right-hand or left-hand turning angles of the same magnitude.

The voltage signal at terminal 108 is connected by line 110 to one end of resistor 114 whose other end is connected to the non-inverting input, terminal 116, of operational amplifier 80c. The inverting input, terminal 118, of operational amplifier 80c is connected by line 126 to an oscillator circuit. The oscillator circuit comprises operational amplifier 80d, resistors 136, 138, 142 and 144 and capacitor 128. Operational amplifier 80d is provided with supply voltage $V_A$, and a feedback resistor 136 connected between input terminal 132 and output terminal 140, and feedback resistor 138 connected between input terminal 134 and output terminal 140. Input terminal 134 is also connected to one end of resistor 142 whose other end is connected to the positive supply voltage, and to one end of resistor 144 whose other end is connected to ground. Also provided is capacitor 128 which is connected between input terminal 132 and ground.

While components of different values as well as different timing and reference levels may be selected for obtaining the functions described below the disclosure will be facilitated by referring to specific values. Thus, in the embodiment disclosed herein as illustrative of the invention, the aforementioned resistors and capacitor of the oscillator circuit are so chosen that the frequency of oscillation of the circuit is 2.0 hertz and the voltage levels at inverting input terminal 132 are 2.51 volts and 7.92 volts, respectively. Thus, the waveform output at terminal 132 is essentially an exponential rise and fall between the limits 2.51 volts and 7.92 volts which may be viewed as a rough approximation of a triangular waveform having the aforementioned minimum and peak voltage levels. This oscillator output waveform at terminal 132 is then fed through connecting line 126 to the inverting input, terminal 118, of operational amplifier 80c as mentioned before. Operational amplifier 80c is also provided with suitable connecting means to supply a voltage $V_A$ and a feedback resistor 122 between output terminal 124 and the non-inverting input, terminal 116. The output of the operational amplifier 80c at terminal 124 is connected by connecting means 125 to alarm 40, which has an opposite terminal connected to ground. Thus, when the amplitude of the signal at the non-inverting input, terminal 116, of the operational amplifier 80c is below 2.51 volts, the oscillator input at the inverting input, terminal 118, which, as described above, is always in excess of 2.51 volts, will cause the output at terminal 124 to go to ground, thus resulting in no alarm signal. When the signal at the non-inverting input, terminal 116, exceeds 2.51 volts, only the portion of the oscillator signal at the inverting input, terminal 118, in excess of 2.51 volts will, in effect, turn off the output of operational amplifier 80c, resulting in a pulsing alarm signal at the rate of 2 hertz. The duration of the pulse of the alarm signal depends on the amount by which the signal at terminal 116 exceeds 2.51 volts. As the signal at terminal 116 increases, only the portion of the oscillator signal at terminal 118 in excess of the amplitude of the signal at terminal 116 will be available to, in effect, turn off the output of operational amplifier 80c, thus resulting in a longer pulse of the alarm signal. When the amplitude of the signal at terminal 116 reaches or exceeds 7.92 volts, the alarm will continue to signal steadily, since 7.92 volts is the maximum amplitude of the oscillator signal at the terminal 118 leaving no available signal at terminal 118 to, in effect, turn off the output of operational amplifier 80c.

Referring now to FIG. 4, the functioning and various modes of operation of the aforementioned circuitry are described in graph form. FIG. 4a illustrates the functioning of the alarm set means of variable resistor 38 in conjunction with the operational amplifiers 80a and 80b and their associated circuitry as described in the reference to FIG. 3. The alarm operation is shown as a function of the angle of turn of the implement hitch for several possible alarm settings. The portion of the graph designated generally by reference numeral 200 illustrates the alarm function when the alarm is set to begin operating at an angle of 20°, that is, when the implement hitch is turned at an angle 20° off of the 0° or straight line position. The open area designated by the arrows 202 indicates the safe operating area, or an area where there is no alarm, between 0° and 20° right and left turns, respectively. The lines 204 and 208 represent a 20° angle of turn to the right or left respectively, and the beginning of the the pulsating alarm function. The shaded areas between lines 204 and 206 and between lines 208 and 210, respectively, indicate the range in which the angle of turn either to the right or to the left is exceeding the 20° alarm preset, causing the alarm pulses to become increasingly longer until the alarm reaches the full on or continuous state at lines 210 and 206 for right and left turns, respectively. The portion of the graph designated generally by reference numeral 212 represents the alarm function when the alarm setting is set to cause the alarm to begin operation at a turning angle of 40° to either the right or the left. The arrows 214 indicate, in a similar manner to the arrows 202 of the previous example, the safe operating range or no alarm condition between 0° turn and 40° turn to the right or left, respectively. The lines 216 and 220 indicate the beginning of alarm pulsing at 40° turn right or left respectively. The shaded areas between lines 216 and 218 in between lines 220 and 222 indicate, as in the previous example, a range of angles of turn in excess of 40° to the right and left, respectively, which will cause the alarm pulses to become longer. The shaded areas above the line 218 and below the line 222, respectively, indicate the areas at which the alarm has reached its full on or continuous condition.

Referring now to the portion of the graph designated generally by reference numeral 224, the alarm function is illustrated for the case where the alarm setting is set for the alarm to begin operation at an angle of turn of 60° to the right or left. The arrows 226 indicate, as in the above examples, the safe operating range, or no alarm condition between 0° turn and a 60° turn to the right or left, respectively. The lines 228 and 232 indicate a 60° turn to the right and left, respectively, and the beginning of the pulsing alarm function. The shaded areas between lines 228 and 230 and between lines 232 and 234 indicate the angles in excess of 60° either to the right or to the left in which the alarm pulse is of increasing width. The shaded areas above line 230 and below line 234 indicate angles of turn to the right and left, respectively, where the alarm is in its full on or continuous mode of operation.

Referring now to FIG. 4b, the function of the operational amplifier 80c, in conjunction with the oscillator circuitry associated with operational amplifier 80d, and the alarm means 40 is illustrated. The three possible modes are illustrated by graphs of various values of input at terminal 116 of the operational amplifier 80c superimposed on the oscillator input at terminal 118 of operational amplifier 80c to achieve the resultant output at terminal 124 of operational amplifier 80c which drives the alarm means 40 of FIG. 3. In the portion of the graph designated by reference numeral 250, line 254 represents an input signal at terminal 116 of 2.51 volts DC. The oscillator input at terminal 18 is represented by the waveform designated by reference numeral 252. Since the oscillator waveform varies between 2.51 and 7.92 volts, the signal provided thereby on the inverting input 118 of the operational amplifier 80c will always be greater than the 2.51 volt input represented by line 254 at the noninverting input terminal 116. Therefore the feedback resistor 122 connected between the output 124 and noninverting input 116 of operational amplifier 80c will cause the output to remain at zero in the case illustrated by graph 250, resulting in a no alarm condition.

Referring now to the portion of the graph designated by numeral 255, line 256 represents an input voltage at terminal 116 greater than 2.51 volts and less than 7.92 volts. In this case the oscillator signal at terminal 118 represented by the waveform designated by numeral 252, will not cause the output to go to zero in its portions below the line 256. Therefore, between points 257 and 258, the output will be a high voltage, and will cause the alarm to pulse on in that interval, while it will be turned off by waveform 252 in the region above line 256, in the same manner as described in the reference to graph 250.

In the portion of the graph designated by reference numeral 260, a DC voltage in excess of 7.92 volts represented by the line 262 is the signal at the noninverting input terminal 116 of operational amplifier 80c, and exceeds the peak value of the oscillator waveform designated by numeral 252 which is the signal at the inverting input terminal 118 of operational amplifier 80c. Therefore, the output at terminal 124 of the operational amplifier 80c will always be a positive voltage, resulting in the alarm being in its full on or continuous condition.

In FIG. 3, a power supply suitable for use with the apparatus according to the present invention is illustrated. Terminals 160 and 162 are connected to the positive and negative terminals of a 12 volt DC tractor battery, or other suitable 12 volt DC source. A fuse 164 is provided in the positive supply line connected to terminal 160. The other end of the fuse 164 is connected to a voltage regulator circuit comprising diodes 166 and 170 and resistor 168, capacitors 172 and 174, and 8 volt DC voltage regulator integrated circuit 180, output capacitor 182 and an output voltage divider comprising resistors 184 and 186. Supply voltage for the four operational amplifiers of integrated circuit package 80 is taken from terminal 176 at the positive end of capacitor 174. An 8 volt DC supply for the remaining circuitry is taken from terminal 188 at the output of the voltage regulator integrated circuit 180. Reference voltage $V_R$ is taken from terminal 190 at the voltage divider comprising resistors 184 and 186 at the output of the voltage regulator circuit.

While a preferred embodiment of the present invention has been shown and described herein, it is obvious that many details may be changed without departing from the spirit and scope of the appended claims.

The invention is claimed as follows:

1. A wheel interference monitor apparatus for use with a tractor and a farm implement connected thereto and being pulled thereby, comprising sensor means connected to said tractor and to said implement for detecting an angle of turn of said implement with respect to said tractor and providing a signal proportional thereto, alarm means, circuit means connected to said sensor means including selector means for adjusting a preset turning angle at which the alarm means is to be activated and providing a signal corresponding thereto, means connected to said sensor means and to said selector means for receiving and comparing said sensor signal and said selector signal and providing an output signal in response thereto, and means connected to said receiving and comparing means and to said alarm means for activating said alarm means in response to said output signal whenever said angle of turn meets or exceeds said preset turning angle.

2. The apparatus of claim 1 wherein said means connected to said receiving and comparing means for activating said alarm means further includes means for activating the alarm means for producing a caution alarm and a danger alarm.

3. The apparatus of claim 1 wherein said circuit means further includes means connected to said alarm means for causing said alarm means to produce a caution alarm when said angle of turn meets said preset turning angle, to produce a danger alarm when said angle of turn exceeds said turning angle by a preset amount, and to produce a gradually changing alarm between the caution alarm and the danger alarm when said angle of turn is between said preset turning angle and said preset excess of said preset turning angle.

4. The apparatus of claim 3 wherein said circuit means further includes symmetry means to cause the alarm means to function identically for turning angles in opposite directions, respectively.

5. The apparatus of claim 1 wherein said sensor means comprises a potentiometer having resistance element and a wiper element, one of said elements being mounted on said tractor hitch and the other of said elements being connected to said implement hitch for angular movement therewith with respect to said tractor hitch.

6. The apparatus of claim 1 further including console means for housing said circuit means, and said alarm means, said console being mounted on said tractor, accessible to an operator thereof.

7. A monitor apparatus for use with a plurality of mobile vehicles connected in a series, said vehicles being connected by hitch means and capable of angular movement with respect to said hitch means, said apparatus comprising sensor means connected to one of said vehicles and said hitch means for detecting angles of turn of said one vehicle with respect to said hitch means and providing signals proportional thereto, alarm means, circuit means connected to said sensor means and to said alarm means for actuating said alarm means, said circuit means including means connected to said sensor and providing output signals in response to said sensor signals whenever said angles of turn meet or exceed predetermined turning angles, and means responsive to said output signals for activating said alarm means.

8. The apparatus of claim 7 wherein said means for providing output signals includes selector means for adjusting said predetermined turning angles at which said alarm means are to be activated and providing signals corresponding thereto, and means for receiving and comparing said sensor means signals and said selector means signals and providing said output signals in response thereto.

9. A wheel interference monitor apparatus for use with a first vehicle and a second vehicle connected thereto and capable of angular movement with respect to said first vehicle, comprising sensor means connected to said first vehicle and to said second vehicle for detecting an angle of turn of said second vehicle with respect to said first vehicle and providing a signal proportional thereto, indicator means, circuit means connected to said sensor means including selector means for adjusting a preset turning angle at which said indicator means is to be activated and providing a signal corresponding thereto, means connected to said sensor means and to said selector means for receiving and comparing said sensor means signal and said selector means signal and providing an output signal in response thereto, and means connected to said receiving and comparing means and to said indicator means for activating said indicator means in response to said output signal whenever said angle of turn meets or exceeds said preset turning angle.

10. The apparatus of claim 9 wherein said circuit means further includes means connected to said indicator means for causing said indicator means to produce a caution alarm when said angle of turn meets said preset turning angle, to produce a danger alarm when said angle of turn exceeds said preset turning angle by a preset amount, and to produce a gradually changing alarm when said angle of turn is between said preset turning angle and said preset excess of said preset turning angle.

11. The apparatus of claim 10 further including console means for housing said circuit means and said indicator means, said console means being mounted for easy access to an operator of said first and second vehicles.

* * * * *